March 7, 1961  D. G. A. COOVER  2,973,780
IRRIGATION PIPE COUPLING
Filed July 5, 1957
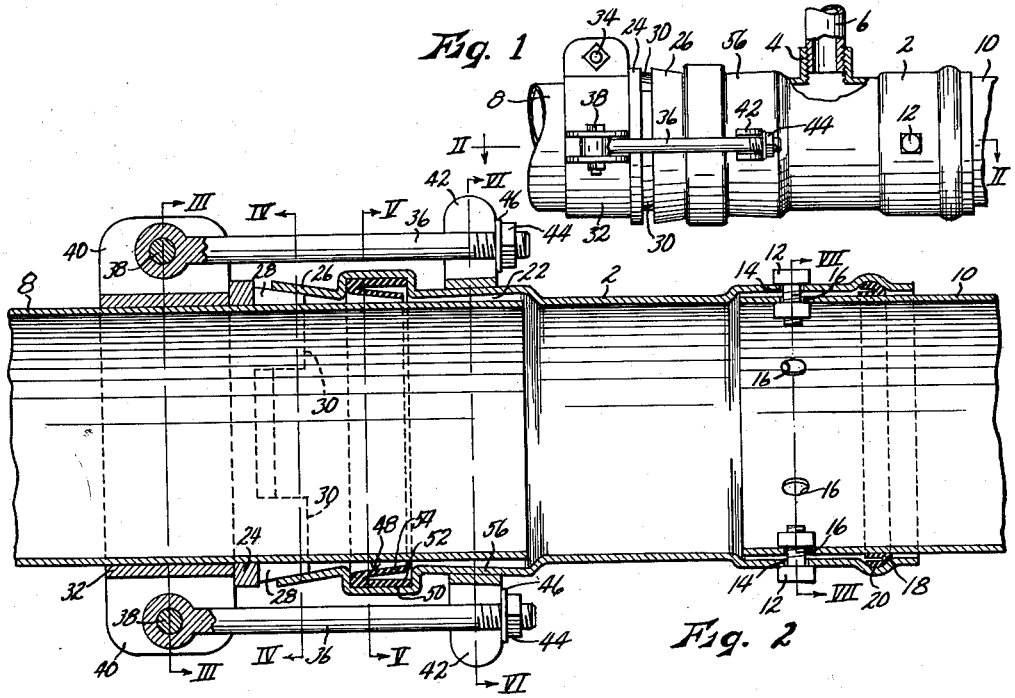
Fig. 1
Fig. 2
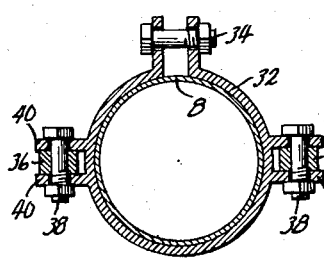
Fig. 3
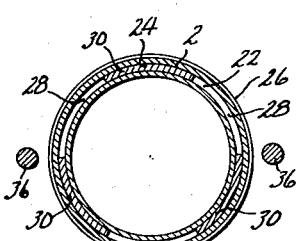
Fig. 4
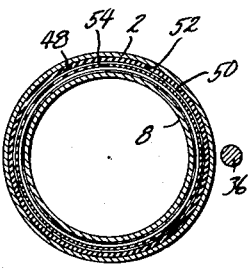
Fig. 5
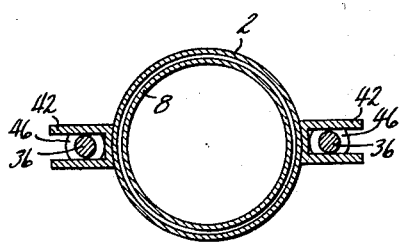
Fig. 6
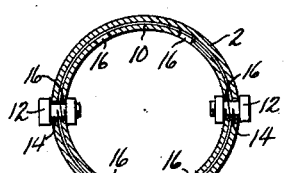
Fig. 7
INVENTOR
Delos G. A. Coover
BY John A. Hamilton
Attorney.

United States Patent Office 2,973,780
Patented Mar. 7, 1961

2,973,780
IRRIGATION PIPE COUPLING
Delos G. A. Coover, P.O. Box 493, Kinsley, Kans.
Filed July 5, 1957, Ser. No. 670,164
2 Claims. (Cl. 137—517)

This invention relates to new and useful improvements in irrigation pipe couplings, and has particular reference to irrigation pipe and coupling systems known commonly as "tractor-pull" equipment.

In portable sprinkler types of irrigation equipment, sprinkler heads are inserted at intervals into a water pipe which lies on the ground, and is connected to a suitable source of water under pressure. Usually, the pipe is divided into sections joined by couplings, and the sprinkler head connections are made into the couplings. When it is desired to shift the pipe to irrigate a new area, the pipe either may be disassembled by disconnecting the couplings and carried to its new location one section at a time, or may without disassembly be towed axially by a tractor or the like to its new location. The present invention concerns the latter type of equipment.

Irrigation pipes of the "tractor-pull" type are preferably provided at intervals, usually at the couplings, with automatic drainage valves which function to drain standing water from the pipe whenever water is no longer being supplied thereto. This lightens the pipe so that it may be towed more easily, and reduces the wear and abrasion along the underside of the pipe caused by sliding it along the ground. Automatic operation of the drainage valves has customarily been obtained by providing each valve with a vane-like projection which extends into the water flowing through the pipe, so that water moving through the pipe would move the vane to close the valve. Cessation of flow would permit the valve to open, whereby the pipe would be drained. Valve operators of this type have been found to obstruct the flow of water to an objectionable extent, and also to catch and hold foreign matter such as grass, twigs, weeds and the like which may be entrained in the water.

The principal objects of the present invention are, therefore, the provision of an irrigation pipe coupling provided with an automatic drainage valve, in which the water flow area is left completely unobstructed and which therefore does not act as a flow restriction to any appreciable extent, and in which the valve cannot easily become fouled either by foreign matter entrained in the water, or by mud or other foreign matter which might tend to enter the drainage openings as the pipe is towed along the ground.

Another object is the provision of a coupling of the character described which will impart a degree of flexibility to a string of pipe for greater maneuverability as it is being towed.

Other objects are simplicity and economy of construction, efficiency and dependability of operation, ease and speed of connection and disconnection, and adaptability for use with pre-existing piping systems.

With these objects in view, as well as other objects which will appear in the course of the specification, reference will be had to the drawing, wherein:

Fig. 1 is a side elevational view, partially broken away, of an irrigation pipe coupling embodying the present invention, shown in operative relationship to a pair of pipe sections, Fig. 2 is an enlarged sectional view taken on line II—II of Fig. 1, and Figs. 3, 4, 5, 6 and 7 are reduced sectional views taken respectively on lines III—III, IV—IV, V—V, VI—VI and VII—VII of Fig. 2.

Like reference numerals apply to similar parts throughout the several views, and the numeral 2 applies to a coupling body formed of aluminum or other suitable material, said body member being tubular and generally cylindrical. Midway between its ends, said body member is provided at its upper side with an internally threaded outlet 4 into which is threaded an upwardly extending pipe 6. It will be understood that a sprinkler head, not shown, is mounted at the upper end of said pipe, and is operable to distribute water delivered to it by said pipe over a large area of ground. A pair of sections 8 and 10 of irrigation pipe have their contiguous end portions inserted axially into the ends of said body member as best shown in Fig. 2.

Pipe section 10 is secured in the body member by a pair of diametrically opposite bolts 12 inserted through holes 14 in said body member and through a pair of a series of peripherally spaced holes 16 formed in pipe section 10. When the lower surface of the pipe becomes worn due to abrasive contact with the ground, bolts 12 may be removed and the pipe turned axially to bring a fresh portion thereof into contact with the ground, the bolts then being re-inserted in a different pair of holes 16. It will be understood that the coupling itself must always be positioned so that sprinkler head pipe 6 extends upwardly, and that this may be accomplished by means of "outrigger" runners or wheels, not shown, attached either to the coupling or to the pipe sections. The narrow annular space between pipe section 10 and body member 2 is sealed against the passage of water by a sealing ring 18 disposed around the pipe and seated in an internal peripheral groove 20 formed in body member 2 adjacent the end thereof.

The portion of body member 2 overlapping pipe section 8 has an internal diameter greater than the external diameter of the pipe, thereby forming an annular water passage 22 therebetween. The pipe is maintained concentrically centered in the body member by a spacer ring 24 which is fitted slidably over the pipe at the end of the body member. Said ring is conically tapered toward the body member and engages in the correspondingly conically tapered end portion 26 of the body member. Since ring 24 fits the pipe closely, it will be apparent that as the tapered portion of the ring is drawn into the conical section 26 of the body member, the pipe will be centered in the body. The tapered section of the ring has peripherally spaced portions thereof cut away to form notches 28 (see Figs. 2 and 4), the remaining portions constituting tongues 30 which project into conical section 26 of the body member. Notches 28 form passages interconnecting water passage 22 with the outer atmosphere, through which water from the interior of the coupling may drain.

Just outwardly from ring 24, a clamp ring 32 encircles pipe section 8, said clamp ring being split for easy application to the pipe, the ends thereof being joined by a bolt 34 whereby the ring may be drawn into clamping engagement with the pipe. A pair of pivot bolts 36 are carried by said clamp ring respectively at diametrically opposite sides thereof, each of said bolts being pivotally connected by means of a bolt 38 between a pair of ears 40 formed integrally with the clamp ring. Said bolts are normally parallel to the coupling axis, and extend toward and overlap the coupling. Each of said bolts is disposed between the arms of a U-shaped clip 42 welded or otherwise fixed to coupling body 2 and opening radially outwardly therefrom. A nut 44 and washer 46 carried on each of said bolts abut the side of clip 42 distal from clamp ring. The clamp ring and pivot bolts thus serve to prevent separation of pipe section 8 from the coupling body. To disconnect the coupling and pipe, it is necessary only to loosen the two nuts 44 and swing the pivot bolts 36 outwardly from clips 42. Clamp ring 32 also serves as a pusher for forcing spacer ring 24 into the end of the coupling body.

The automatic valve for opening or closing water passage 22 constitutes a soft, resilient rubber sealing ring 48 (Figs. 2 and 5) seated in an internal peripheral groove 50 formed in coupling body 2 just inwardly from conical section 26 of said body, and surrounding the end portion of pipe section 8. Said sealing ring is substantially V-shaped in cross-sectional contour, opening axially of the body and away from the open end thereof. It has an outer wall 52 which seats in groove 50, and an inner wall 54 which is spaced apart from the outer wall and disposed adjacent the wall of pipe 8. The normal minimum internal diameter of inner wall 54 is greater than the external diameter of the pipe, so as to leave water passage 22 unobstructed and permit the drainage of water through passage 22 and notches 28 of spacer ring 24 to the ground. However, when water is fed to the pipe under pressure during operation of the irrigation system, water will enter passage 22 with greatly increased speed and pressure. This water also enters the space between outer wall 52 and inner wall 54 of valve ring 48, and its pressure and velocity will contract or force inner wall 54 inwardly against the wall of pipe 8, thereby effectively sealing passage 22. At the same time the water pressure will force outer wall 52 firmly into body groove 52, preventing leakage of water around the sealing ring. When the water supply is shut off and the pressure thus reduced, sealing ring 48 will recover its normal shape due to its own resilience, thereby opening passage 22 to drain the pipe. The sealing ring 48 should of course possess sufficient rigidity to resist deformation by the static pressure of water at rest in the pipe.

It will further be seen that since pipe 8 is restrained positively against transverse movement in the coupling body only at the point the tongues 30 enter the conical portion 26 of the body, the pipe axis may be tilted slightly with respect to the coupling axis, using the tongues as a fulcrum. The coupling body is taperingly enlarged inwardly from valve sealing ring 48, as indicated at 56, to increase the possible angle of deflection. While the maximum angle at one coupling is slight, it is cumulative in a long string of pipe having many couplings. The increased flexibility thus imparted to a string of pipe provides a valuable contribution to the maneuverability of the pipe as it is towed from one place to another. Within the limits indicated, angularity between the pipe and coupling axes will not affect the operation of sealing ring 48.

While I have shown and described a specific embodiment of my invention, it will be apparent that numerous minor variations of structure and operation could be made without departing from the spirit of the invention as defined by the scope of the appended claims.

What I claim as new and desire to protect by Letters Patent is:

1. An irrigation pipe coupling comprising a tubular body receiving the contiguous ends of a pair of pipe sections telescopingly in the opposite end portions thereof, means for securng said pipe sections against withdrawal from said body, one end portion of said body member being of greater internal diameter than the external diameter of the pipe received therein whereby to form an annular water passage therebetween, the portion of said body at the end thereof adjacent said annular passage being conically enlarged normally open valve means carried by said body and controlling said annular passage and operable by water entering said passage with substantial pressure and velocity to close and seal said passage, a spacer ring encircling the pipe associated with said valve, said spacer ring having a conically tapered section engaged in the conical enlargement of said body whereby said pipe is centered concentrically in said body, and wherein said means securing the pipe associated with the valve to the body includes means retaining said spacer ring in engagement with said body, the conically tapered section of said spacer ring having water passages formed therethrough communicating with said annular passage.

2. An irrigation pipe coupling as recited in claim 1 wherein said valve constitutes a resilient sealing ring seated in an internal peripheral groove formed therefor in said body and surrounding said pipe, said sealing ring including a peripheral wall normally spaced apart from said pipe but being deflectable into sealing engagement with said pipe by water entering said passage with substantial velocity and pressure.

References Cited in the file of this patent

UNITED STATES PATENTS

| | | |
|---|---|---|
| 1,330,899 | Penhallegon | Feb. 17, 1920 |
| 2,327,572 | Wallis | Aug. 24, 1943 |
| 2,505,631 | Webster | Apr. 25, 1950 |
| 2,535,816 | Sigmund | Dec. 26, 1950 |
| 2,649,105 | Stout et al. | Aug. 18, 1953 |
| 2,652,282 | Willetts | Sept. 15, 1953 |
| 2,687,905 | Jacobs | Aug. 31, 1954 |
| 2,709,092 | Wallace | May 24, 1955 |
| 2,730,116 | Rickard | Jan. 16, 1956 |
| 2,743,899 | Kinney | May 1, 1956 |
| 2,801,591 | Jacoby | Oct. 27, 1957 |